United States Patent [19]

Stein

[11] Patent Number: 5,064,263

[45] Date of Patent: Nov. 12, 1991

[54] MULTIPLEXING APPARATUS FOR THE DIRECT OPTICAL RECEPTION OF A PLURALITY OF OPTICAL WAVELENGTHS

[75] Inventor: Karl-Ulrich Stein, Unterhaching, Fed. Rep. of Germany

[73] Assignee: Siemens Aktiengesellschaft, Munich, Fed. Rep. of Germany

[21] Appl. No.: 477,534

[22] Filed: Feb. 9, 1990

[30] Foreign Application Priority Data

Feb. 16, 1989 [DE] Fed. Rep. of Germany ....... 3904752

[51] Int. Cl.[5] .............................. G02B 6/12; H04J 1/00
[52] U.S. Cl. ......................................... 385/14; 385/24; 385/33; 385/130; 359/129
[58] Field of Search ............... 350/96.11, 96.12, 96.15, 350/96.16, 96.17; 250/227.11; 370/1, 3; 372/44, 48

[56] References Cited

U.S. PATENT DOCUMENTS

| | | | |
|---|---|---|---|
| 4,279,464 | 7/1981 | Colombini | 350/96.19 |
| 4,606,602 | 8/1986 | Unger et al. | 350/96.12 |
| 4,690,489 | 9/1987 | Neyer | 350/96.14 |
| 4,723,829 | 2/1988 | Koonen | 350/96.19 |
| 4,842,357 | 6/1989 | Doneen | 350/96.12 |
| 4,909,584 | 3/1990 | Imoto et al. | 350/96.16 |
| 4,950,044 | 8/1990 | Makita | 350/96.14 |
| 4,989,935 | 2/1991 | Stein | 350/96.11 |
| 5,010,543 | 4/1991 | Hill | 370/3 |

OTHER PUBLICATIONS

D. L. Lee, "9.4 Guided-Wave Beam deflector" *Electromagnetic Principles of Integrated Optics,* 1986, John Wiley & Sons, N.Y., pp. 257-273.

*Primary Examiner*—Brain Healy
*Attorney, Agent, or Firm*—Hill, Van Santen, Steadman & Simpson

[57] ABSTRACT

An apparatus for direct optical reception of a plurality of wavelengths which includes a substrate having a waveguide disposed thereon for conducting the wavelengths, a waveguiding wavelength demultiplexer being integrated on the substrate for spreading the wavelengths into separate channels extending to separate opto-electronic detectors which are preferably integrated on the substrate. The device further includes an integrated transmitter so the device is a bi-directional functional unit having both an integrated transmitter and integrated direct receiver.

11 Claims, 3 Drawing Sheets

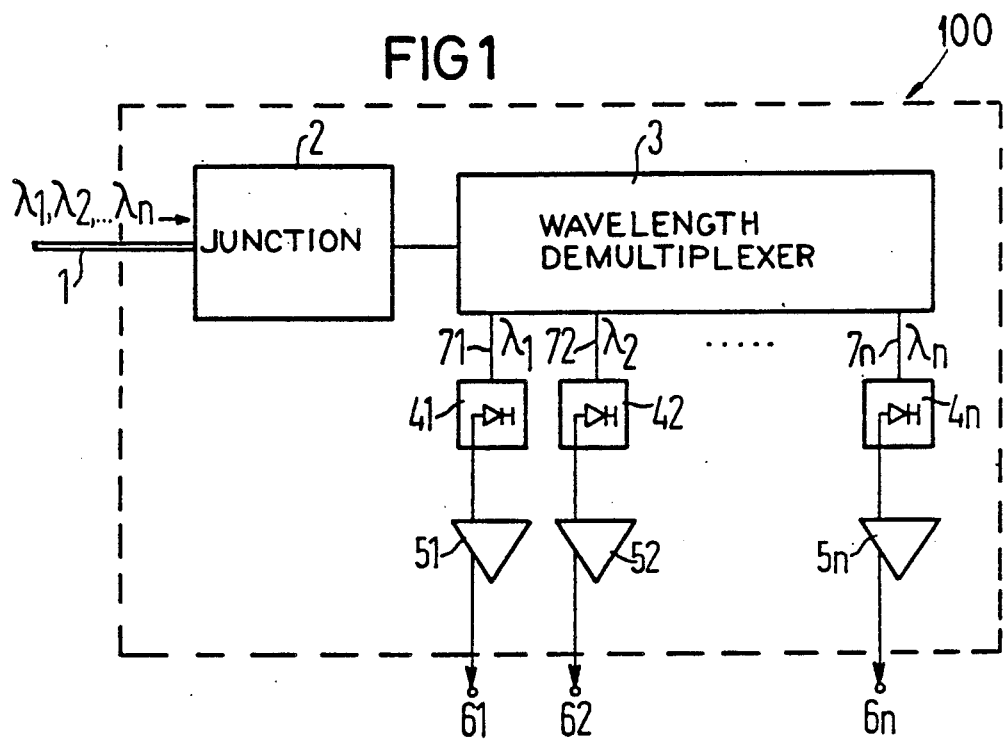
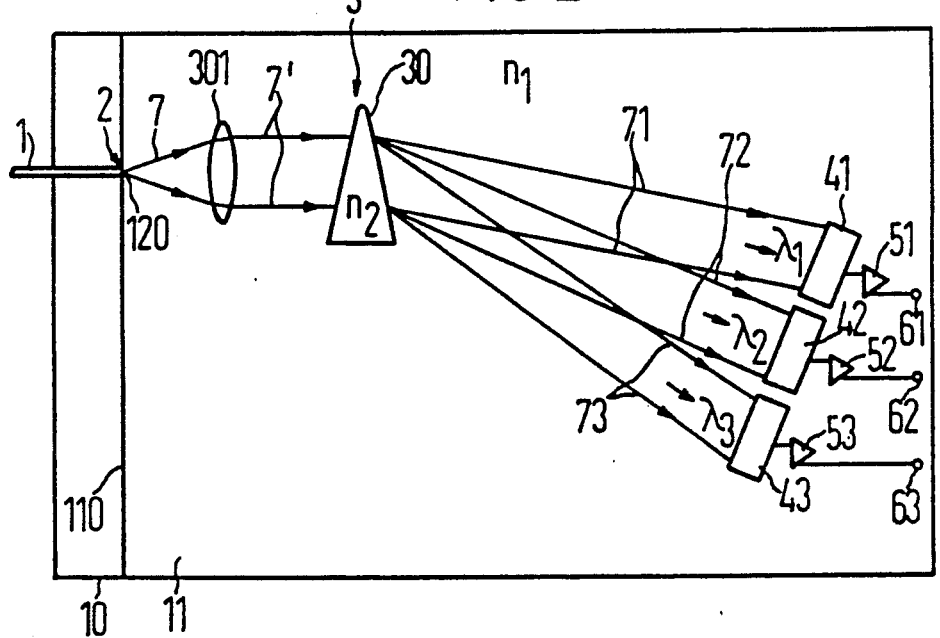

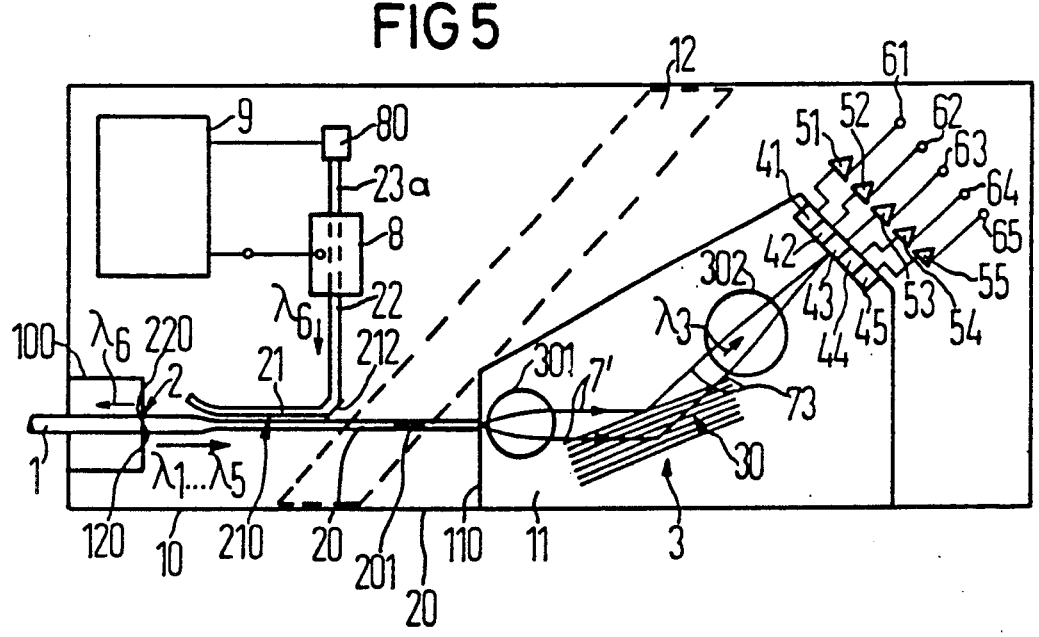

MULTIPLEXING APPARATUS FOR THE DIRECT OPTICAL RECEPTION OF A PLURALITY OF OPTICAL WAVELENGTHS

BACKGROUND OF THE INVENTION

The present invention is directed to an apparatus for the direct optical reception of a plurality wavelengths incoming on a common channel and being distributed into a plurality of separate channels leading to different opto-electronic detectors.

In the wavelength region around 1.3 $\mu$m and 1.6 $\mu$m, an optical fibers offer broad optical windows, particularly compared to the bandwidth used by the electrical modulation. There are therefore a number of system proposals to utilize the windows with a plurality of modulated wavelengths. The desired wavelength is then selected at the receiver by a hetterodyne reception or by direct reception with filters. Heterodyne reception, in fact, offers the best properties for the transmission. Its outlay, however, is extremely high due to the tuneable, extremely narrow-banded, local oscillators and due to the measures to prevent fluctuations in the polarization of the transmitted waves.

The above-mentioned direct reception offers cost-beneficial solutions for data rates up to the region of 10 Gbits/seconds as required, for example, for video or, respectively, the HDV (high definition video) or HDTV (high definition television video) distribution. It is known to construct such direct receivers of discrete components or in modules. The optical waves are conducted between the individual function elements as free beams. However, the costs of the solutions are prohibitively high for the intended, broad employment

SUMMARY OF THE INVENTION

The object of the present is to provide a cost beneficial apparatus for receiving a plurality of wavelengths incoming on a common channel and having means to distribute the plurality of wavelengths in separates channels leading to different opto-electrical detectors This object is achieved by an improvement which is a waveguiding wavelength demultiplexer that is integrated on a substrate of a semiconductor material for guiding and distributing the incoming wavelengths onto the various channels.

The substrate employed in the apparatus in the invention is preferably composed of silicon.

The demultiplexer of the invention is preferably fashioned in or on a planer waveguide layer.

In an advantageous development of the apparatus of the invention, the demultiplexer can comprise a structure of dielectric strip waveguides which are arranged as wavelength selective directional couplers. For example, the strip waveguides can be fashioned in the form of rib waveguides. However, they can also be fashioned in the form of increased refraction index in the substrate in regions thereof or in the planar waveguiding layer on the substrate.

In another advantageous development of the apparatus of the invention, the demultiplexer comprises a waveguiding, planar prism which receives the incoming wavelength. This prism can be defined by the structure having a higher refractive index $n_2$ in the planar-waveguiding layer which has a lower refractive index $n_1$.

In another advantageous development of the apparatus of the invention, the demultiplexer comprises a planar diffraction grating to which the incoming waveguides are conducted. This diffraction grating can be fashioned on or in the planar waveguiding layer for, for example, in the form of a surface grating.

It is advantageous particularly given a demultiplexer constructed as either the planar prism or the diffraction grating to conduct the incoming waveguide to the demultiplexer or to the detectors via a collimator lens in the form of a planar lens integrated on the substrate and/or a collecting lens integrated on the substrate between the demultiplexer and detector. In accordance with the prior art, the lenses can be Lunebury lens, geodetic lenses or Fresnel lenses (see D.L. Lee, *Electromaqnetic Principals of Integrated Optics*, 1986, John Wiley & Sons, New York, page 268).

In the apparatus in the invention, the electronic detectors and required impedance transformers or preamplifiers for the electrical signals are advantageously integrated on the substrate.

An integrated detector is advantageously composed of a Schottky barrier diode having a Schottky contact layer of a metallically conducting material adjacent to the semiconductor material, whereby the contact layer is coupled by leakage waves coupling to the waveguiding layer in which the wavelength is conducted from the demultiplexer. Such diodes disposed on a silicon base are disclosed in an earlier German Patent Application P 39 00 422.8.

It is likewise advantageous to integrate a fiber mount and adjustment on the substrate. Preferably the fiber mount comprises an etched V-groove in which a fiber can be adjusted and fixed, and this fiber forms a channel for the incoming wavelengths.

It is also advantageous when a coupling optic is integrated on the substrate. This preferably comprises a spherical lens that is arranged in a V-groove fashioned on the substrate.

The apparatus of the invention realizes a cost-beneficial opto-electronic circuit wherein the optical waves are preferably guided in planar waveguides and wherein the required optical functions are represented by planar optical components like waveguides, lenses, prisms, deflecting mirrors and directional couplers.

The particular advantage of the apparatus of the invention is that all of the optical functions of the receiver from a mounting of an optical fiber up to the pre-amplifiers can be presented with an IC-compatible process steps in a silicon monolith having an edge length of less than 10 $\times$ 10mm$^2$ and without any assembly and balancing steps. There is thus the possibility of manufacturing these with a cost, reliability and required space for these functions on an order of magnitude in mass production that is justifiable for video signal distribution.

In terms of the system and technology aspects, the arrangement of the invention is compatible with a proposal for a monolithically integrated, bi-directional module disclosed in a co-pending U.S. Pat. Application Ser. No. 408,561, filed Sept. 18, 1989, which issued as U. S. Pat. No. 4,989,935 on Feb. 5, 1991 and claims priority from German Application P 38 33 311.2.

For realizing such a module, an apparatus of the invention is advantageously developed so that a semiconductor laser for generating a wavelength to be coupled into one channel in a direction opposite the incoming wavelengths is applied on the substrate. The wavelength emitted by the semiconductor laser can be advantageously coupled into the one channel by an optical directional coupler integrated on the substrate, and the incoming wavelengths are simultaneously conducted to the multiplexer via the directional coupler.

It is also advantageously, particularly given employment of this last-named directional coupler, to guide the wavelengths emitted by the semiconductor laser into the one channel by a deflecting mirror integrated onto the substrate. The semiconductor laser itself is fixed on the substrate in the form of a chip, wherein the semiconductor laser can be a DFB (distribution feedback) laser. An electronic circuit for operating the semiconductor laser is advantageously integrated on the substrate.

The apparatus of the invention, which is developed into the bi-directional transmitter/receiver module, accordingly, all aspects except the semiconductor laser, that is hyberdized as a chip, can be represented in or on the substrate of the semiconductor material partially composed of silicon.

For monitoring the optical power emitted by the semiconductor laser, the monitor diode is advantageously integrated on the substrate.

A region for electrical and optical shielding is to be provided on the substrate between the semiconductor laser and the demultiplexer in such an apparatus.

It is expedient to conduct the incoming wavelengths to the demultiplexer through a wavelength filter integrated on the substrate. This wavelength filter is impermeable for the wavelength emitted by the laser but it is transmissive for the incoming wavelengths. The wavelength filter is advantageously fashioned on a strip waveguide leading in the direction to the demultiplexer.

Other advantages and features of the invention we will be readily apparent from the following description of the preferred embodiments, the claims and drawings.

BRIEF DESCRIPTION OF THE DRAWINGS

FIG. 1 is a block circuit diagram showing the fundamental structure of an exemplary apparatus for the direct optical reception of a plurality of wavelengths;

FIG. 2 is a plan view of an embodiment of the apparatus of FIG. 1 for three wavelengths which embodiment is integrated on the substrate, wherein the demultiplexer is composed of a planar prism and wherein the collimator lens is provided;

FIG. 5 is a plan view of an embodiment of FIG. 4 constructed as a transmission and reception module;

FIG. 6 is a plan view of an embodiment wherein the demultiplexer is constructed of a plurality of strip waveguides arranged in a plurality of directional coupler; and FIG. 7 is a schematic cross-sectional view of a fiber plug and jack for connecting a fiber to the apparatus to the present invention.

DESCRIPTION OF THE PREFERRED EMBODIMENTS

Figure 3:
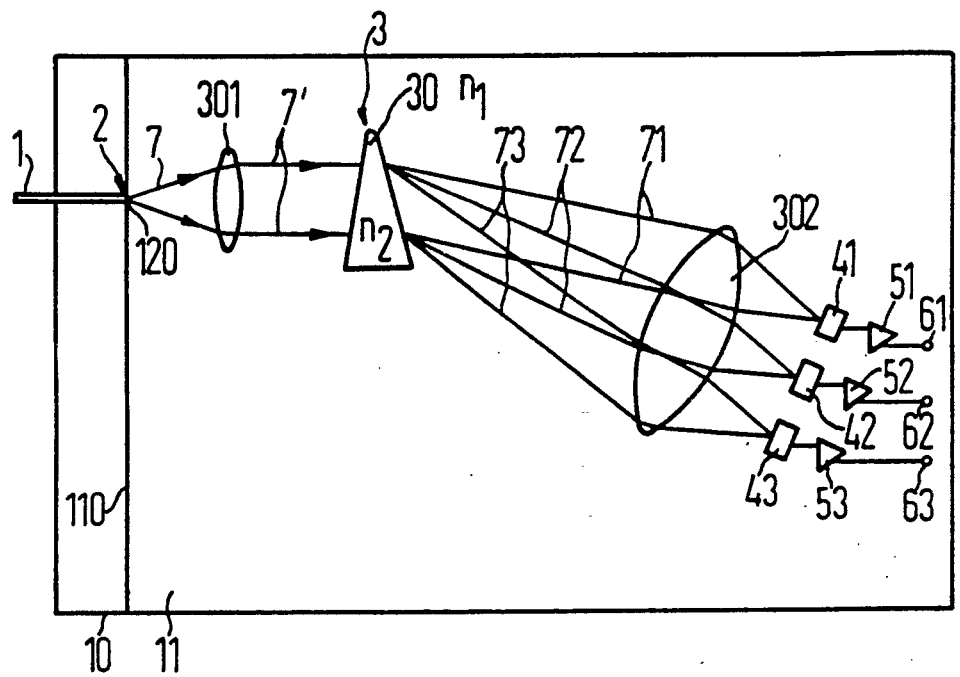
FIG. 3 is a plan view of a modification of the apparatus of FIG. 2 which includes a collecting lens.

The present invention is particularly useful when incorporated into the apparatus schematically illustrated in FIG. 1 and generally indicated at 100. The apparatus 100 includes a junction 2 for connecting a common channel 1 such as a waveguide through which a plurality of wavelengths $\lambda_1, \lambda_2..., \lambda_n$ are introduced in a direction of the arrow. The junction 2 connects the common channel 1 to an integrated waveguide which conveys the different wavelengths to an integrated, waveguiding wavelength demultiplexer 3 that will distribute the wavelengths $\lambda_1, \lambda_2..., \lambda_n$ that are received from the common channel 1 into a plurality of separate channels 71, 72,..., 7n which lead to different optoelectronic detectors 41, 42,..., 4n. The opto-electronic or opto-electrical detectors, such as 41, 42,..., 4n have their outputs connected to impedance transformers or amplifiers 51, 52,..., 5n which have outputs 61, 62,..., 6n for the electrical signal from the transformer.

Figure 4:
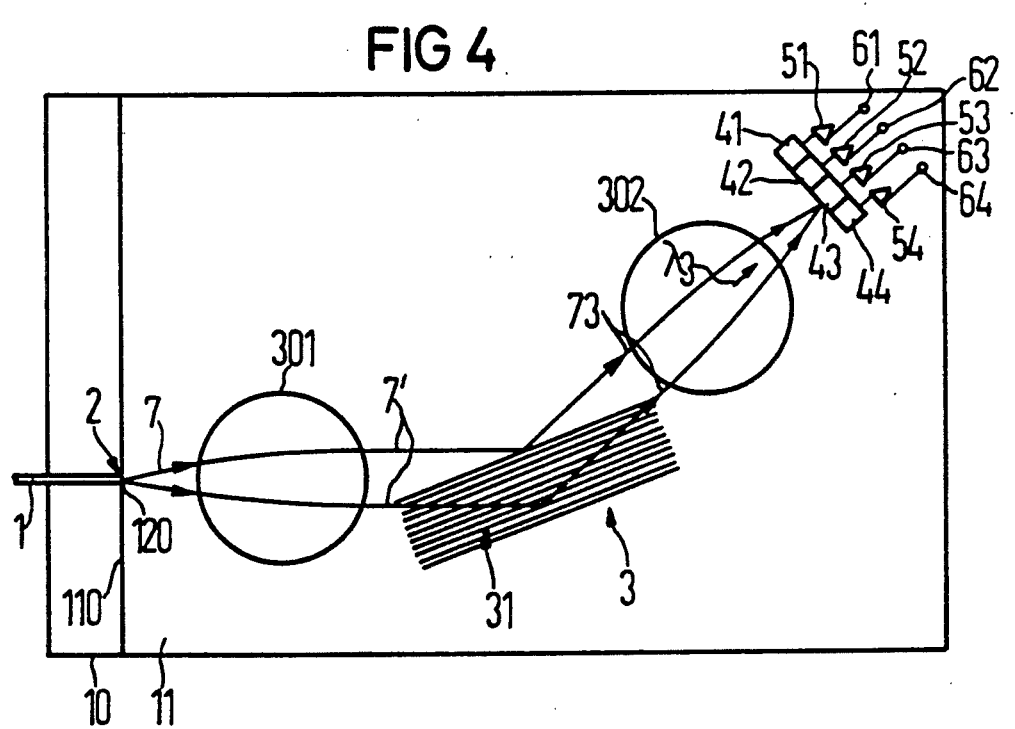
FIG. 4 is a plan view of an embodiment of the invention wherein the demultiplexer is a defraction grating and has both a collimating and collecting lenses in the form of Luneburg lenses or geodetic lenses.

In this above description, n denotes a whole number greater than 1 that specifically and without limiting the general validity is selected to equal 3 in the embodiment of FIGS. 2 and 3, to be equal to 4 in the embodiments of FIGs. 4 and 6, and to be equal to 5 in the embodiment of FIG. 5.

In the exemplary embodiments of FIGS. 2-6, the common channel 1 is realized as an optical fiber. The junction 2 in all these exemplary embodiments is realized by a butt coupling between the fiber 1 and an integrated waveguide 11, 20 or 704. This means that the end face of the fiber 1 and an end face of an integrated waveguide 11, 20 or 704 lie directly opposite one another at the junction 2. In the exemplary embodiments of FIGS. 2-4, the waveguiding layer 11 is integrated on the substrate 10 and has an end face 110 which forms the junction 2 with an end face 120 of the fiber 1. In the exemplary embodiments of FIGS. 5 and 6, a strip waveguide 20 is integrated on the substrate 10 and has an end face 220 forming the junction 2 with the end face 120 of the fiber while in FIG. 6 the waveguide or strip waveguide 704 is integrated on the substrate 10 and has an end face 7040 which forms the junction 2 with an inface 120 of the waveguide 1.

In the exemplary embodiments of FIGS. 2-5, the demultiplexer 3 is arranged on or respectively in a planar waveguiding layer 11 which was integrated onto the substrate 10. In the exemplary embodiments of FIGS. 2 and 3, the demultiplexer 3 is composed of a planar prism 30 that is defined by a triangular region having a higher refractive index $n_2$ than the refractive index $n_1$ of the planar waveguiding layer 11. Thus the index $n_1$ is lower than the lower index $n_2$.

In the exemplary embodiments of FIGS. 4 and 5, the demultiplexer 3 is composed of a diffraction grating 31 that is realized in or on the planer, waveguiding layer 11. For example, it is formed on a surface by a surface grating on this layer.

In the embodiment of FIG. 6, the demultiplexer 3 is composed of a structure of dielectric strip waveguides 701–704 which are integrated on the substrate 10 and are connected in series following one another to define wavelength-selective optical directional couplers 741–743 in a specific fashion. For example, the dielectric strip waveguide 701–704 can be rib waveguides or diffused or ion-implanted strip-shaped waveguides. The later, for example, can be fashioned under the surface of the substrate 10 or can be fashioned in a planar, waveguiding layer on the substrate 10.

In the embodiments of FIGS. 2-5, the optical wave guide coupled into the planar, waveguiding layer 11 from the fiber 1 and containing the incoming wavelengths $\lambda_1, \lambda_2,...\lambda_n$ propagate in a divergent beam in the layer 11 so that this wave increasingly spreads. This is unfavorable in view of the separate channels 71, 72,...7n that are to be generated. The beams conducted in a collimated fashion having a small or disappearing divergence angle or divergence beams are more suitable for this purpose. Such beams can be created or generated in the planar, light or waveguiding 11 with 1 or more planar lenses arranged in the beam path of a guided, divergent beam 7, for example, with the planar lenses of the prior art.

In the examples of FIGS. 2-5, for example, a collimator lens 301 is arranged in the region of the layer 11 in the beam path of the divergent beam 7 and between the junction 2 and the demultiplexer 3. This collimator lens 301 collimates this divergent beam 7, for example, into a form of parallel beam 7' in the form of parallel ray beam. The collimated beam 7' is conducted to the prism 30 or a diffraction grating 31 which will spread this beam 7' into a plurality of different, collimated sub-beams 71, 72, 73,... 7n that define the various channels and correspond in number to the plurality of incoming wavelengths, with each of these sub-beams containing only one incoming wavelength such as $\lambda_1$, $\lambda phd\ 2$, $\lambda_3$, ... and $\lambda_n$.

In the region of the layer 11 in which the spread, guided sub-beams or, respectively, channels 71, 72, 73,... 7n are adequately spatially separated from one another, an allocated detector 41, 42, 43... 4n is integrated on the substrate 10 in the beam path of each of the sub-beams. Each of these detectors may take the form of a Schottkey barrier diode.

Impedance transformers or amplifiers 51, 52, 53,... 5n require for processing the electric output of the detectors 41, 42, 43,.. 4n are likewise integrated on the substrate.

In the embodiment of FIG. 2 the sub-beams or respectively, channels 71, 72, 73,.. 7n are supplied to the detectors 41, 42 and 43 as parallel ray beams. In the exemplary embodiments of FIGS. 3-5, the sub-beams or respectively channels 71, 72, 73,..7n are focused onto the detectors 41, 42, 43, 44, 45.

It is specifically established in these apparatus that the divergent beam 7 is focused into a parallel beam 7' by a collimator lens 301. This parallel beam 7' is then conducted to the demultiplexer 3 and a collecting lens 302 which in the form of a planar lens and which focuses each of the sub-beams onto the allocated detector, is arranged in the beam paths of the spread sub-beams or respectively channels 71, 72..., 7n. Thus, the collecting lens 302 is arranged between the demultiplexer 3 and the detectors 41, 42..., 4n.

In the exemplary embodiment of FIG. 6 which uses the structure composed of strip waveguides, the directional coupler 741, 742 and 743 connected following one another are dimensions such with reference to their wavelengths activity that, for example, the first directional coupler 741 will couple the wavelength $\lambda_1$ into the strip waveguide 701 from the wavelengths $\lambda_1$ -$\lambda_4$ which are passing in the strip waveguide 704. The waveguide 701 leads to the detector 41. The next directional coupler 742, for example, will couple the wavelength $\lambda_2$ into the waveguide 702 which leads to the detector 42. Third directional coupler 743, for example, will couple the $\lambda_3$ from the waveguide $\lambda_4$ into the strip waveguide 703 which leads to the detector 43. The waveguide 704 which contains the wavelength $\lambda_4$ continues to the detector 44 and these waveguides 701-704 from the separate channels 71, 72, 73 and 74 respectively. In the example, n separate channels for n different wavelengths can generally be generated with n − 1 wavelength-selective directional couplers. Tree structures having directional couplers arranged in the branches can also be employed.

In the example of FIG. 5, which represents a bidirectional function unit in the form of a transmission-reception module for five incoming wavelengths $\lambda_1$ through $\lambda_5$ and one transmission wavelength $\lambda_6$, a semiconductor laser 8 in the form of a DFB (distribution feedback) laser chip will emit the transmission waveguide $\lambda_6$ and is fixed on the substrate 10. This transmission wavelength $\lambda_6$ is coupled into the waveguide 1 by an integrated optical directional coupler 210, and the fiber 1 is fixed on the substrate 10 by a mount and fixing 100. The directional coupler 210 is composed of an integrated strip waveguide 21 and of a section of an integrated strip waveguide 20 leading from the fiber 1 to the planar waveguiding layer 11 of the receiver. The one end 220 of the strip waveguide 20 is coupled to the fiber 1 by a butt coupling. The junction from the strip waveguide 20 to the layer 11 can likewise be formed by a butt coupling. The layer 11 and the waveguide 20 can also be formed of a single piece on substrate.

The wavelength $\lambda_6$ is applied to the waveguide 21 of the directional coupler 210 through an integrated strip waveguide 22 by an integrated deflecting mirror 212 that deflects the transmission wavelength $\lambda_6$ to the waveguide 21.

On the backside of the laser 8, the laser emission is conducted by a waveguide 23a to a monitor diode 80 which is integrated on the substrate 10. This monitor diode 80 and the laser 8 are connected in electrical conductive fashion to an electronic laser driver/controller 9 which is integrated on the substrate 10 and serves for operating and monitoring the laser 8 together with the diode 80.

A region 12 for an electrical and optical shielding between the transmitter receiver is provided on the substrate 10 between the transmitter and the direct receiver A wavelength filter 201 is integrated on the strip waveguide 20 also serves the purpose of the shielding. This wavelength filter is transmissive for the wavelength $\lambda_1$ through $\lambda_5$ but has a blocking effect for the transmission wavelength $\lambda_6$.

The directional coupler 210 is preferably a wavelength-selective directional coupler that is dimensioned so that only the transmission wavelength $\lambda_6$ will couple over in it.

FIG. 7 shows a schematic, axial longitudinal section through a fiber plug 26 comprising a fiber 1 and through a jack 27 while in their plugged condition. A substrate 10, which has integrated thereon an apparatus of the invention not shown, for example, an apparatus of FIG. 5 or FIG. 6 as well is integrated is mounted in the jack 27. Other components, for example, electrical energy store can also be contained in the jack 27. One or more electrical lines can also lead away from or to the jack 27, for example, lines that are connected to the output of the amplifier or impedance transformers or/and lines for an energy supply. The traditional techniques are suitable for mounting the substrate 10 in the jack 27.

The junction 2 between the fiber 1 and the strip waveguide integrated on the strip waveguide integrated on the substrate 10, for example, the waveguide 20, is effected with a coupling optics 23 that is integrated on the substrate 10 and that focusses the light beam 7 emerging from the fiber 1 in a divergent fashion onto a strip waveguide 20. The coupling optics 23 are integrated on the substrate 10 and focus the lightbeam 7 emerging from the fiber 1 in divergent fashion into the strip waveguide 20. The coupling optics 23 can be expediently composed of a spherical lens 230 that is fixed in a channel 203 that preferably has a V-shape profile and is fashioned on the substrate 10 and leads to the strip waveguide 20. When fastening the substrate 10 and the jack 27, care must be exercised to see that the spherical lens 230 and the endface 220 of the strip waveguide are arranged on an axis 25 of the beam 7 after the jack 27 is plugged together. When fixing the spherical lens 230 in the groove 203, care must already be exercised to see that this is arranged at the correct spacing from the end face 220 of the strip waveguide 20. The end face 120 and 220 of the fiber 1 and respectively the waveguide 20 are then arranged at the correct spacing from the spherical lens 230 when the end face 120 of the fiber 1 is situated in the object plane of the spherical lens 230 and the end face 220 of the waveguide 20 is situated in an image plane of the lens 230 allocated to the object plane.

The arrangement of FIG. 7 represents a compact apparatus for direct optical reception that is extremely simple to manipulate and is not susceptible to disruptions that can be manufactured in a simple and cost-beneficial way with traditional plug-connector elements for fibers.

Although other modifications and changes may be suggested by those skilled in the art, it is the intention of the inventor to embody within the patent warranted hereon all changes and modifications as reasonably and properly come within the scope of his contribution to the art.

I claim:

1. In an apparatus for direct optical reception of a plurality of wavelengths being received in a common channel, said apparatus having means for distributing the plurality of wavelengths in a plurality of separate channels leading to different opto-electrical detectors, the improvements comprising said means for distributing including a waveguiding wavelength demultiplexer integrated on a substrate of a semiconductor material for guiding and distributing the incoming wavelengths into the various channels, said demultiplexer comprising a structure of dielectric waveguides being arranged to form wavelengths selective directional couplers with one coupler for each wavelength.

2. In an apparatus for direct optical reception of a plurality of wavelengths being received in a common channel, said apparatus having means for distributing the plurality of wavelengths in a plurality of separate channels leading to different opto-electrical detectors, the improvements comprising said means for distributng including a waveguiding wavelength demultiplexer integrated on a substrate of a semiconductor material for guiding and distributing the incoming wavelengths into the various channels, the opto-electrical detectors being integrated on said substrate and an amplifier for each of the detectors being integrated on the substrate for receiving electrical signals from the opto-electronic detector.

3. In an apparatus according to claim 2, wherein the detectors are composed of Schottky barrier diodes having a contact layer of metallically conductive material adjoining a semiconductor material wherein the contact layer is coupled by leakage wave coupling to a waveguiding layer formed on said substrate in which the wavelengths from the demultiplexer are carried.

4. In an apparatus for direct optical reception of a plurality of wavelengths being received in a common channel, said apparatus having means for distributing the plurality of wavelengths in a plurality of separate channels leading to different opto-electrical detectors, the improvements comprising said means for distributing including a waveguiding wavelength demultiplexer integrated on a substrate of a semiconductor material for guiding and distributing the incoming wavelengths into the various channels, said apparatus including coupling optics being co-integrated on the substrate, the coupling optics comprising a spherical lens arranged in a V-shaped groove fashioned on the substrate.

5. In an apparatus for direct optical reception of a plurality of wavelengths being received in a common channel, said apparatus having means for distributing the plurality of wavelengths in a plurality of separate channels leading to different opto-electrical detectors, the improvements comprising said means for distributing including a waveguiding wavelength demultiplexer integrated on a substrate of a semiconductor material for guiding and distributing the incoming wavelengths into the various channels, said apparatus including a semiconductor laser for generating a wavelength other than the wavelengths in said common channel being applied on the substrate and means for coupling the wavelengths from the semiconductor laser into said common channel in a direction extending opposite to the incoming wavelengths.

6. In an apparatus according to claim 5, wherein the wavelength emitted by the semiconductor layer is coupled into the common channel by an optical directional coupler integrated on the substrate, whereby the incoming wavelengths are simultaneously conducted to the demultiplexer via said directional coupler.

7. In an apparatus according to claim 5, wherein the semiconductor laser is fixed on a substrate in the form of a chip, and an electronci circuit for the operation of the semiconductor laser is integrated on said substrate.

8. In an apparatus according to claim 7, which includes a monitor diode being integrated on the substrate.

9. In an apparatus according to claim 5, which includes said substrate having a region of electrical and optical shielding arranged between the semiconductor laser and the demultiplexer on the substrate.

10. In an apparatus according to claim 5, which includes a waveguide on the substrate for receiving incoming wavelengths, said waveguide having a wavelength filter impermeable to the wavelength emitted by the laser and being transmissive to the incoming wavelengths.

11. In an apparatus according to claim 10, wherein said waveguide on the substrate is a strip waveguide leading in direction to the demultiplexer and said wavelength filter is fashioned on said strip waveguide.

* * * * *